United States Patent [19]

Kerner

[11] 3,744,227

[45] July 10, 1973

[54] PORTABLE FRUIT HARVESTER

[76] Inventor: Fred G. Kerner, 4638 E. Grant Avenue, Fresno, Calif.

[22] Filed: Sept. 24, 1971

[21] Appl. No.: 183,604

[52] U.S. Cl. ................................................ 56/335
[51] Int. Cl. .......................................... A01g 19/08
[58] Field of Search .................... 56/332, 335, 336, 56/337, 338; 30/249, 250, 251

[56] References Cited

UNITED STATES PATENTS

| | | | |
|---|---|---|---|
| 1,303,885 | 5/1919 | Goussy | 56/335 |
| 1,522,841 | 1/1925 | Siefken | 56/335 |
| 1,844,158 | 2/1932 | Hain | 30/251 |
| 2,246,747 | 6/1941 | Metzger | 56/335 |
| 91,698 | 6/1869 | Adams | 56/335 |
| 1,247,878 | 11/1917 | Raney | 30/249 |
| 2,407,803 | 9/1946 | Thomas | 56/336 |
| 1,166,586 | 1/1916 | Garrison | 56/336 |
| 906,412 | 12/1908 | Griffin | 56/336 |
| 1,308,677 | 7/1919 | Kosich | 56/335 |

FOREIGN PATENTS OR APPLICATIONS

| | | | |
|---|---|---|---|
| 142,949 | 1/1931 | Switzerland | 56/336 |
| 258,574 | 4/1913 | Germany | 56/338 |

Primary Examiner—Russell R. Kinsey
Attorney—Vergil L. Gerard

[57] ABSTRACT

The portable fruit harvesting device disclosed consists of clipper a mounted on the upper end of a pole at an angle with the pole axis so that the clipper is disposed in a generally horizontal plane when the pole axis is tilted to form about a 45° angle with the ground. The clipper has a fixed blade and a movable blade, pivotally connected, and the movable blade is actuated by pivotal movement of an L-shaped lever arm mounted on the pole near the clipper. The L-shaped lever is pivoted by pulling a cable which passes down the center of the pole to the lower end and where it is attached to a squeeze handle. The L-shaped lever arm is resiliently biased to place the movable blade in an open position with respect to the fixed blade, and a fruit catcher is positioned below the clipper to catch the fruit.

5 Claims, 6 Drawing Figures

United States Patent [19]
Kerner
[11] 3,744,227
[45] July 10, 1973
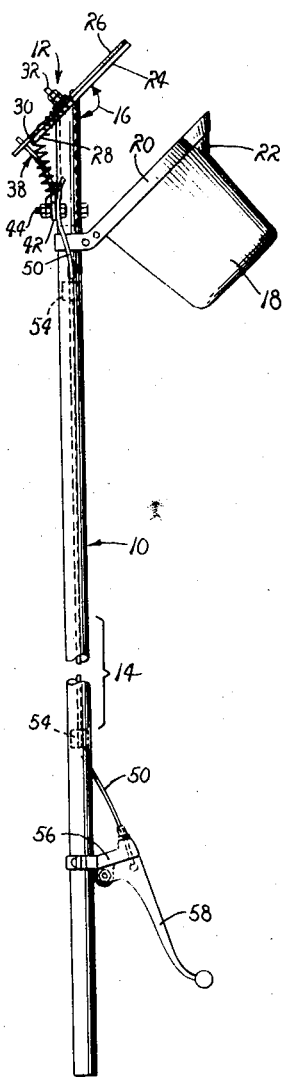

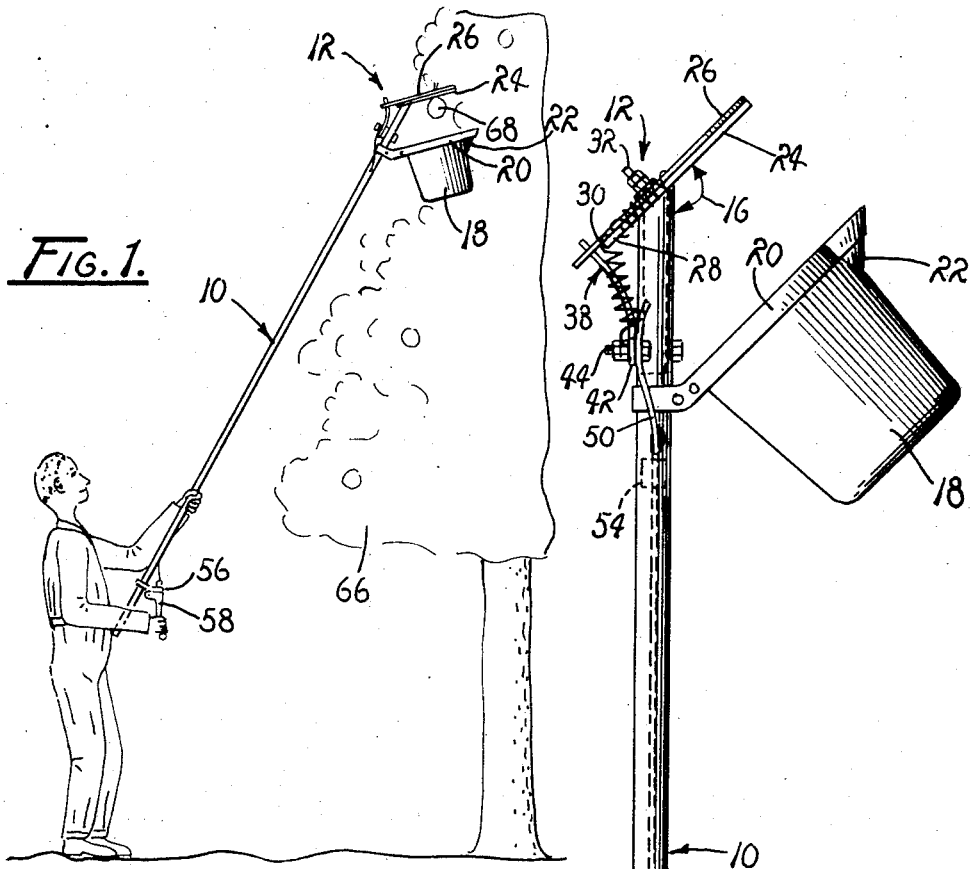
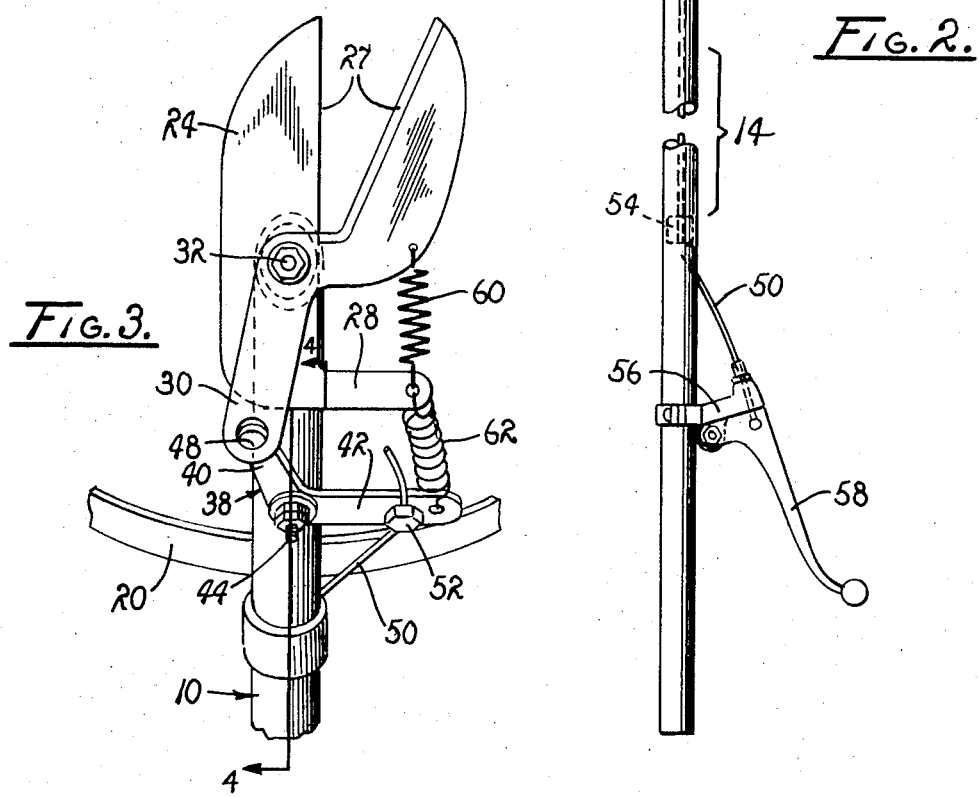

3,744,227

PORTABLE FRUIT HARVESTER

BACKGROUND OF INVENTION

This invention relates generally to devices for harvesting fruit and more particularly to fruit harvesters which are hand operated from ground level.

Numerous pole type fruit harvesters have been devised for picking fruit on the uppermost portions of fruit trees in an orchard by a picker located on the ground. Such devices have not been generally acceptable due to their usually complex structures including complicated power systems for actuating the fruit stem clippers.

Accordingly, it is a major object of this invention to provide an improved portable fruit harvester which is relatively lightweight and can be easily and conveniently manipulated by the picker.

Another object is to provide a portable fruit harvester of the character described which is mechanically operated by a simple squeeze handle and blade actuating mechanism.

A further object is to provide a portable fruit harvester which has the clippers disposed at an angle to the pole axis so that the clipper blades approach the fruit stem in a substantially horizontal plane when the pole is tilted toward the tree at approximately a 45° angle with the ground.

Yet another object of this invention is to provide a portable fruit harvester which is able to accommodate a variety of sizes of fruit with substantially no modification.

These and other objects and advantages of the invention will become more clearly apparent upon reference to the following description and accompanying drawing.

BRIEF DESCRIPTION OF THE DRAWING

FIG. 1 is a side elevation of a portable fruit harvester embodying the principles of the present invention, showing the upper operating end thereof disposed in a fruit engaging position.

FIG. 2 is an enlarged side elevation of the fruit harvester, showing the operating parts in greater detail.

FIG. 3 is a further enlarged partial top plan view of the upper operating end of the portable fruit harvester of the present invention showing the stem severing clippers and their actuating lever.

DESCRIPTION OF PREFERRED EMBODIMENT

Figure 4:
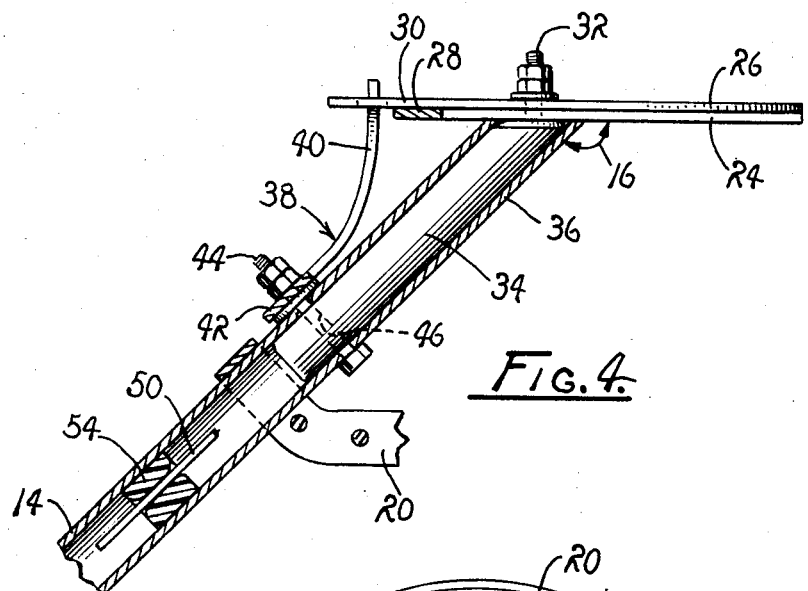
FIG. 4 is a partial vertical section taken on line 4—4 in FIG. 3 through the upper operating end of the portable fruit harvester.
Figure 5:
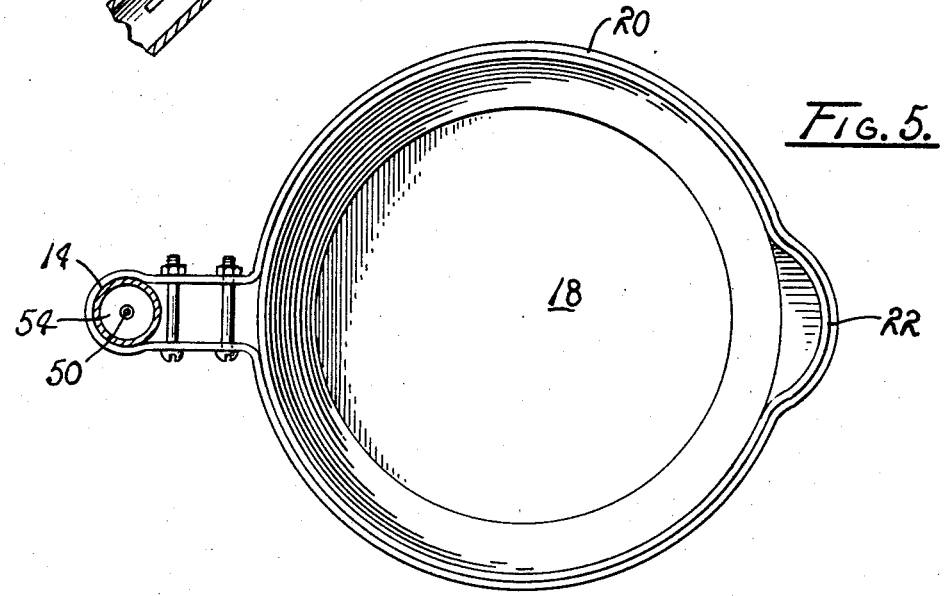
FIG. 5 is somewhat enlarged horizontal section taken just below the fruit stem clippers and showing the fruit catcher.

Referring now to the drawing, and particularly FIGS. 1 and 2 thereof, the numeral 10 designates generally my portable fruit harvester which consists of a clipper 12 mounted on the upper end of a pole 14. The clipper 12 is disposed at an angle 16 of approximately 135° with respect to the axis of the pole so that when the axis of the pole is tilted to an angle of about 45° with the ground the clippers are generally horizontal. The angle 16 may be varied depending on the height and diameter of the trees and the type of fruit to between 120° and 150°, however, an angle 16 of 135° is acceptable for most uses. A catcher 18 formed of relatively rigid materials such as polyethylene plastic is mounted on the pole 14 just below the clippers 12 by means of a bracket 20. The catcher 18 is disposed directly between the clippers so that it catches fruit cut by the clippers and has a spout 22 to facilitate emptying the fruit when the end of the pole 14 containing the clippers is lowered to ground level.

As best shown in FIGS. 3 and 4, clipper 12 have a fixed blade 24 and a movable blade 26. Each of the blades has a cutting edge 27 on its forward portion which move past one another in shearing action when the movable blade is actuated. The fixed blade 24 has a tail 28 on its rearward portion which extends outwardly at substantial right angles to the forward portion of the blade, and the movable blade 26 has a tail 30 on its rearward portion which extends from the cutting edge 27 in general alignment with the forward portion of the blade. The blades are pivotally interconnected intermediate their ends by a pivot pin 32 which is secured to the fixed blade 24 and pivotally mounts the movable blade 26 thereon. The pivot pin 32 is attached to a mounting plug 34 which is disposed within the bore in the upper end 36 of the pole 14, to mount the clipper 12 on the pole.

To actuate the movable blade 26 of the clippers 12, I provide an L-shaped actuating lever 38 which has an upstanding leg 40 and a base leg 42. The actuating lever 38 is pivotally mounted at the junction of its legs on the upper end 36 of the pole 14 by means of a lever pivot pin 44. The lever pivot pin 44 passes through a pivot pin bore 46 in the upper end 36 of the pole and the lower portion of the plug 34 and holds the plug 34 in the pole. The base leg 42 is longer than the upright leg 40 to provide lever advantage in actuating the movable blade 26, as will be further explained later. The upper end of the upstanding leg 40 passes through an engagement hole 48 in the tail 30 of the movable blade 26 so that pivotal movement of the lever 38 about the pivot pin 44 pivots the upstanding leg 40 out of alignment with the pole 12 and pivots the forward portion of movable blade 26 about its pivot pin 32 and across the forward portion of the fixed blade 24, thereby passing the cutting edges 27 over one another in a scissors or shearing movement.

A cable 50 is attached to the base leg 42 of the lever 38 by means of a securing bolt 52, and extends into the bore in the pole 14 and down the bore to the lower end of the pole. Guides 54 are provided in the bore of the pole to center the cable and guide its reciprocal movement. A manually operable squeeze handle 56 is attached to the lower end of the pole. The squeeze handle 56 has a pivotally movable lever handle 58 to which the lower end of the cable 50 is attached so that squeezing the lever handle 58 toward the lower end of the pole 14 draws the cable 50 downwardly and pivots the actuating lever 38.

The movable blade 26 is resiliently biased toward an open position, with its forward portion separated from the forward portion of the fixed blade 24 by a blade spring 60. In this open position the forward portions of the blades are disposed to receive a fruit stem between the cutting edges 27. The blade spring 60 is connected under tension between the forward portion of the movable blade 26 and the tail 28 of the fixed blade 24.

To further assure normal positioning of the movable blade in its open position and to urge positioning of the lever handle 58 to its unactuated position separated from the lower end of the pole 14, the actuating lever 38 is resiliently biased to its unactuated position, where the upstanding leg 42 is generally aligned with the axis of pole 14, by actuating lever spring 62. The actuating lever spring 62 is connected under tension between the outer end of base leg 42 and the tail 28 of the fixed arm 24.

Figure 6:
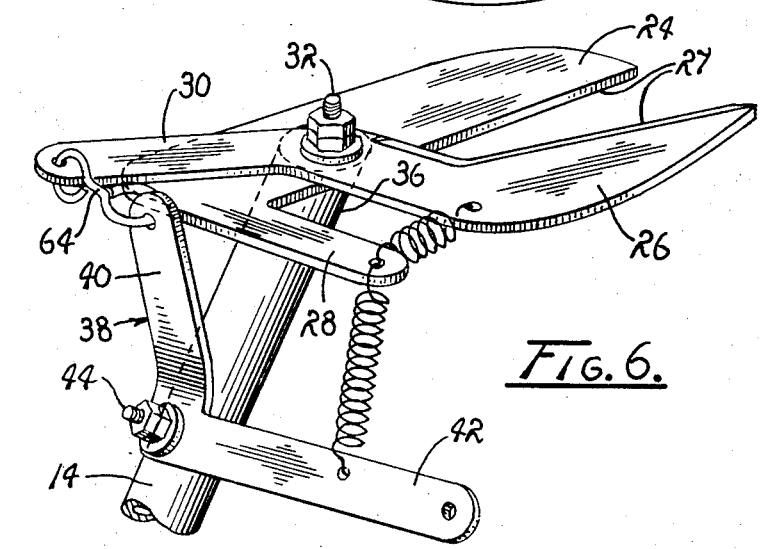
FIG. 6 is a perspective view of the fruit stem clippers showing the blades and operating lever.

In FIG. 6 I show a modified form of the preferred embodiment of the preferred embodiment of my invention, in which the upper end of upstanding leg 40 is connected to the tail 30 of movable arm 26 by a link 64, instead of by insertion in hole 48.

On both forms of my preferred embodiment, the upstanding let 40 of the actuating lever 38 is bent outwardly from the pole 14 at its uppermost end, to permit an increased spacing between the pivot pin 32 and the point of engagement with the tail 30.

OPERATION

The preferred embodiment of my invention operate as follows: The user supports the pole 14 by its lower end, as shown in FIG. 1, and tilts the pole toward fruit hanging on a tree in the manner illustrated. The clipper 12, with the movable blade 26 in its open position as described above, are moved into position above the fruit so that the stem of the fruit is between the cutting edges 27 of the clipper blades. In the usual situation the pole will be at an angle of about 45° to the ground, when the clipper is so positioned, and the clipper blades will, therefore be substantially horizontal since the angle 16 is 135°.

The user then severs the stem of the fruit by squeezing the actuating handle 58 toward the pole 14. This draws the cable 50 downward which in turn moves the base leg 42 downward against the resilient bias of actuating lever spring 62, pivoting the actuating lever 38. As the actuating lever 38 pivots, its upstanding leg 40 moves from alignment with the pole 14 outwardly in the direction of base leg 42, driving the tail 30 of movable blade 26 in the same direction and moving the forward portion of the movable blade pivotally about the pivot pin 32, against the resilient bias of blade spring 60. As the movable blade 26 is so pivoted its cutting edge 27 is carried across the cutting edge 27 on the fixed blade 24 in a scissors or shearing action which severs the stem of the fruit.

Since the catcher 18 is positioned below the clipper the fruit, after its stem is severed, falls into the catcher.

When the handle 58 is released the blade spring 60 ad the actuating lever spring 62 draw the movable blade 26, and the actuating lever 38, respectively, back to their original positions, and the harvester is ready to use again.

When the catcher 18 is filled or the desired amount of fruit has been gathered, the user withdraws the upper end of the pole 14 from the tree and lowers it with the catcher positioned over a box or other gathering device. When the pole is sufficiently lowered the fruit in the catcher 18 pours out of the spout 22 into the box.

The catcher 18 can be a flexible sack as well as a relatively rigid catcher, however, the catcher, as I have described it, protects the fruit from the tree branches and is especially easy to dump.

From this detailed description of the parts and operation of a preferred embodiment of my invention, it will be understood that it is fully capable of attaining the objects and providing the advantages heretofore attributed to it.

The angular positioning of my clipper 12 with respect to the axis of the pole 14 provides ease in aligning the clipper blades about the fruit stem, and my actuating mechanism assures a definite severing of the stem without excessive effort by the user. The actuating mechanism including the blade tails 28 and 30, the actuating lever 38, and the actuating handle 56, all combine to provide a powerful severing action in the clipper without any untoward effort by the operator. In fact, my clippers are so effectively actuated that my harvester can be used for light pruning as well as harvesting fruit.

The convenience of my portable fruit harvester is further illustrated by the simplicity of its actuating mechanism which provides shearing action with only three moving parts, blade, lever and handle, and by the fact that when formed primarily of aluminum with a plastic catcher its total weight is only about 2 pounds.

I claim:

1. A portable fruit harvester comprising:

a pole having a lower end and an upper end;

fruit stem severing means mounted on the upper end of said pole, said fruit stem severing means having relatively movable blades including a fixed blade attached to the upper end of said pole and having a forward end with a cutting edge thereon and a tail end disposed substantially at right angles to said forward end, and a movable blade having a forward end with a cutting edge thereon and a tail end disposed substantially in alignment with said cutting edge, said movable blade being pivotally secured to said fixed blade at a point on said blades intermediate their forward ends and tail ends;

blade actuating means pivotally mounted on the upper end of said pole adjacent said fruit stem severing means, and operatively associated with said blades, and including a lever arm pivotally mounted intermediate the ends thereof adjacent said fruit stem severing means, said lever arm having a first end operatively interconnected with the tail end of said movable blade and a second end operatively interconnected with said linkage means, and so disposed that actuation of said linkage means pivots said lever arm and moves said movable blade to pass the cutting edge on the forward end thereof into shearing relationship with the cutting edge of said fixed blade; linkage means interposed between the upper end and the lower end of said pole and interconnected with said blade actuating means;

manual operating means disposed adjacent the lower end of said pole and interconnected with said linkage means, said operating means being operable to drive said blade actuating means through said linkage means; and fruit receiving means interconnected with said pole and disposed below said fruit severing means to receive fruit falling by gravity after severance of the stem by said fruit stem severing means.

2. A portable fruit harvester as described in claim 1, in which:

said blades of said fruit stem severing means are so disposed as to form an angle with the axis of the lower portion of said pole between 120° and 150°.

3. A portable fruit harvester comprising:

a pole having a lower end and an upper end;

a fixed blade attached to the upper end of said pole intermediate its ends with a forward end extending forwardly of said attachment and having a cutting edge thereon, and a tail end extending rearwardly of said attachment;

a movable blade pivotally mounted intermediate its ends on the upper end of said pole in shearing relationship with said fixed blade, said movable blade having a forward end extending forwardly of said pivotal mounting and having a cutting edge thereon disposed to cooperate with the cutting edge on said fixed blade for shearing action upon said pivotal movement of said movable blade, and a tail end extending rearwardly of said pivotal mounting;

linkage means interposed between the upper end and the lower end of said pole and operably interconnected with said tail end of said movable blade and actuatable to pivot said movable blade, and resilient means interposed between said linkage means and said tail end of said fixed blade and disposed to resiliently urge said linkage means to pivot said movable blade away from shearing relationship with said fixed blade;

manual operating means disposed adjacent the lower end of said pole and interconnected with said linkage means, said operating means being operable to drive said linkage means to pivot said movable blade into shearing relationship with said fixed blade; and a severed fruit collector mounted on the upper end of said pole and disposed below said blades to catch fruit falling by gravity after severence of the stem by shearing action of said blades.

4. A portable fruit harvester as described in claim 3 in which:

said tail end of said fixed blade extends substantially normal to said forward end;

said resilient means is a tension spring interconnected between said tail end of said fixed blade and said linkage means; and said blades are disposed for shearing action in a plane bearing an angular relationship with the axis of said pole of 120° to 150°.

5. A portable fruit harvester as described in claim 3 in which:

said linkage means includes an L-shaped lever having an upstanding leg and a base leg, said lever being pivotally mounted on the upper end of said pole adjacent said blades with said upstanding leg drivingly interconnected with the tail end of said movable blades.

* * * * *